Aug. 4, 1953  G. E. MILLER  2,647,521
HOP PICKING MACHINE
Filed March 16, 1949  3 Sheets-Sheet 1
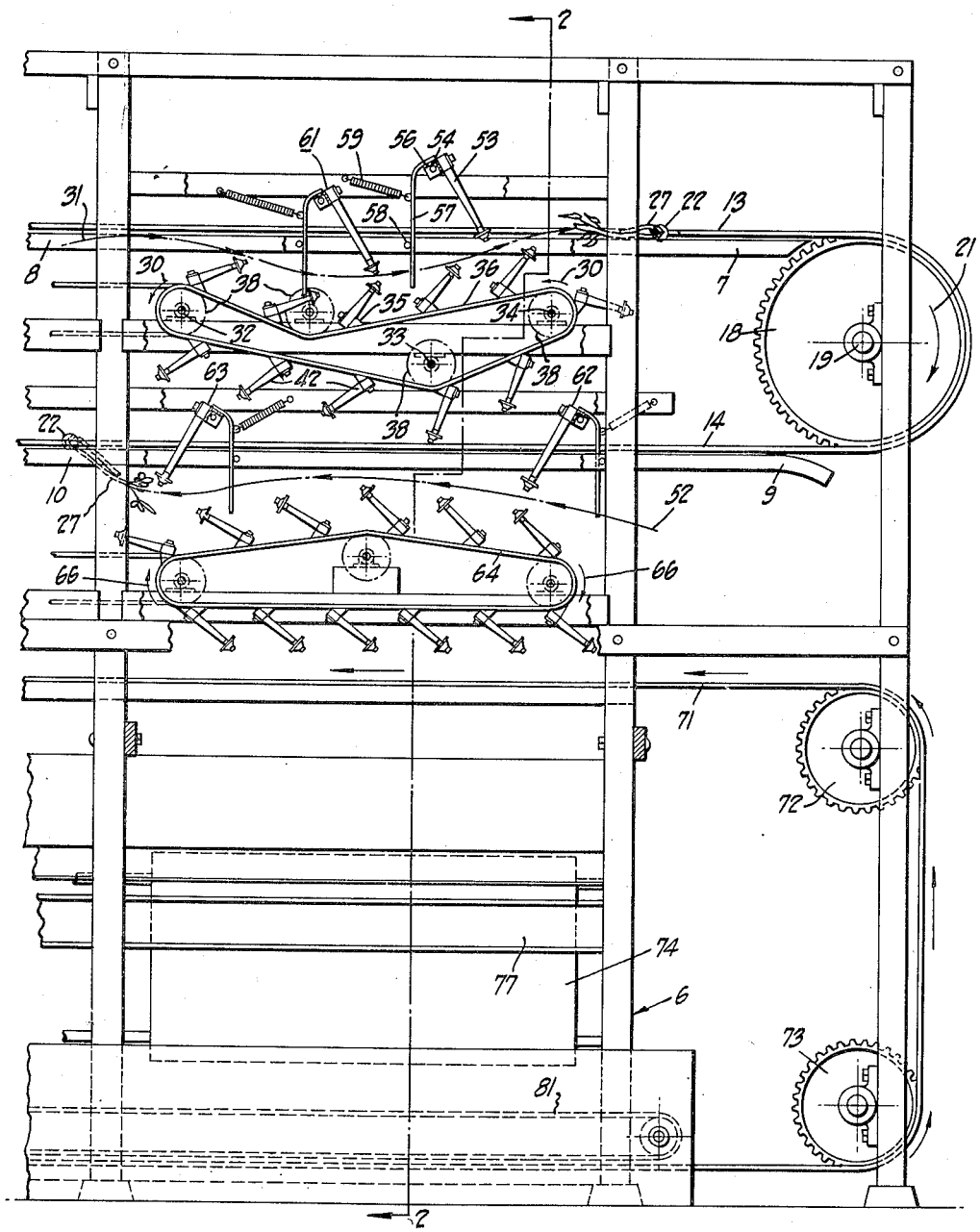
FIG_1_
INVENTOR.
George E. Miller
BY Aug. 4, 1953 G. E. MILLER 2,647,521
HOP PICKING MACHINE
Filed March 16, 1949 3 Sheets-Sheet 2
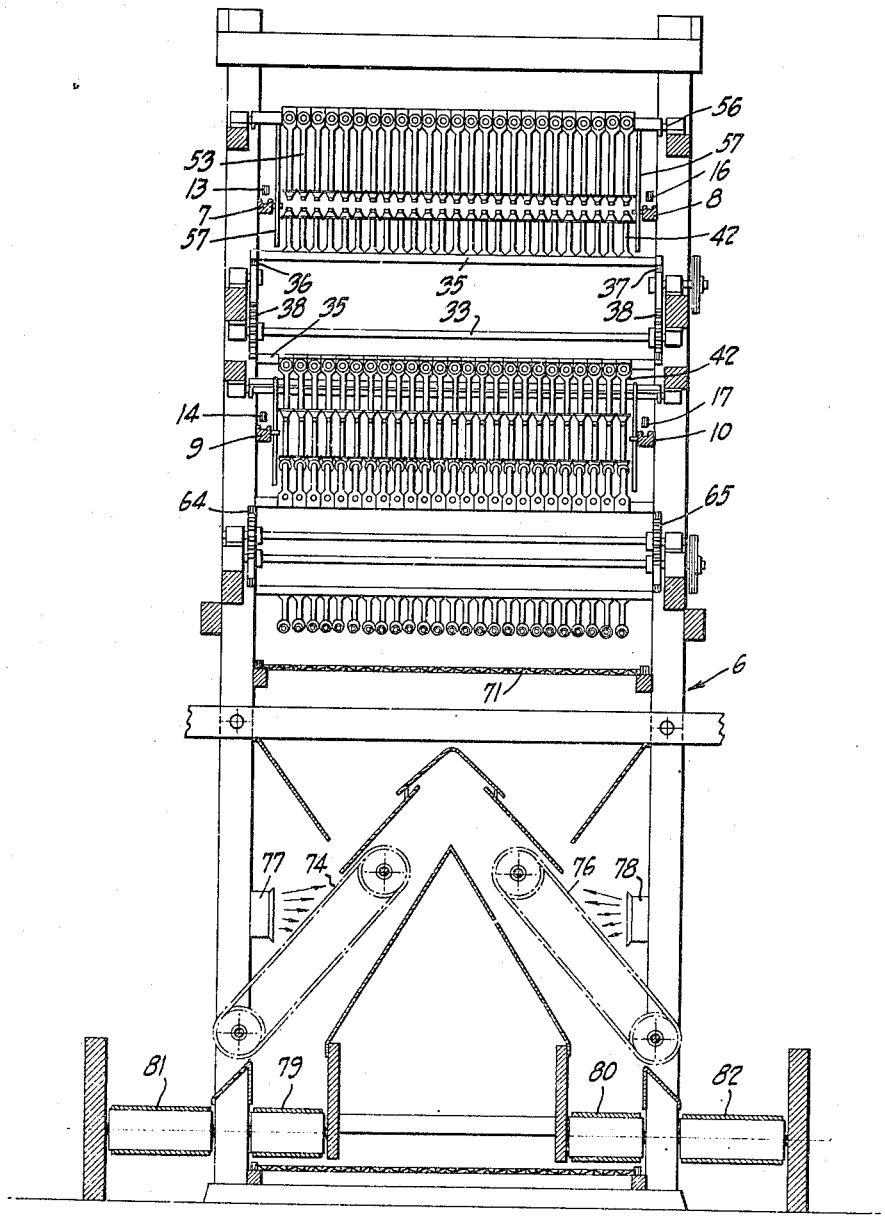
FIG_2_
INVENTOR.
George E. Miller
BY Aug. 4, 1953
G. E. MILLER
2,647,521
HOP PICKING MACHINE
Filed March 16, 1949
3 Sheets-Sheet 3
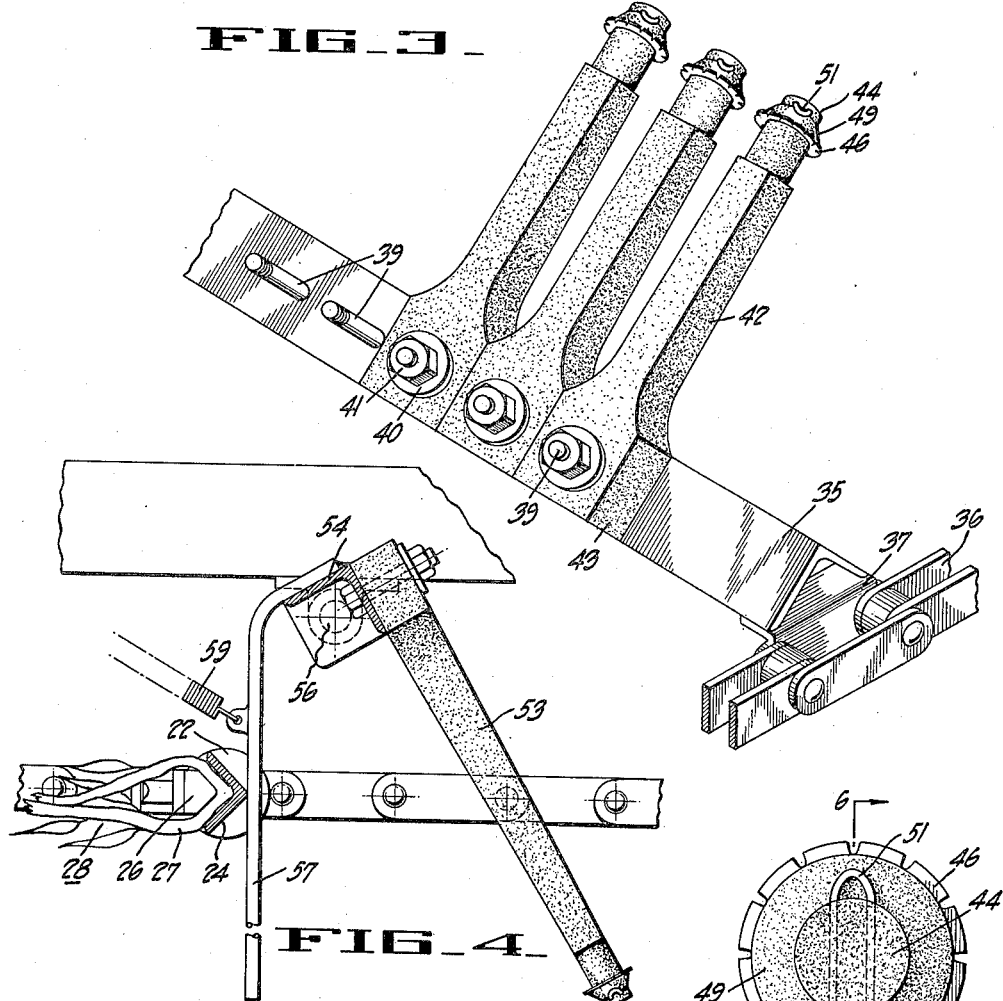
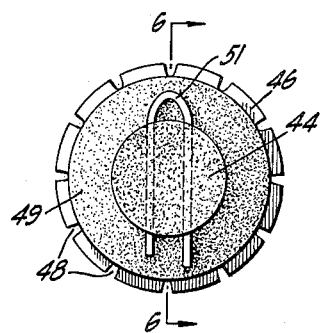
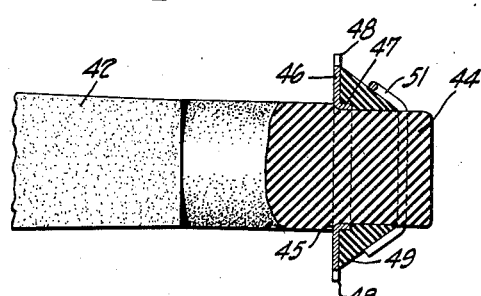
INVENTOR.
George E. Miller
BY Marcus Lothrop Patented Aug. 4, 1953

2,647,521

UNITED STATES PATENT OFFICE 2,647,521

HOP PICKING MACHINE

George E. Miller, Sacramento, Calif., assignor to E. Clemens Horst Company, San Francisco, Calif., a corporation of New Jersey Application March 16, 1949, Serial No. 81,749

3 Claims. (Cl. 130—30)

My invention relates to mechanism for use in removing hops from hop vines. Numerous machines have been developed from time to time, many of them patented by me, for the purpose of removing hops from vines mechanically. One of the difficulties is that hops are quite delicate and must be handled with great care and another factor is that substantially all of the hops must be removed from the vine for economic reasons. In recent years, there has grown up the practice of propelling a portable hop picking machine through a field of growing hops, in addition to the older practice of cutting the growing hops and bringing the vines to a central point where stationary picking machinery is located.

It is an object of my present invention to provide a hop picking machine adaptable for use in a central location to which the cut hop vines can be brought for picking, and also adaptable for use in a portable machine movable through a field of growing hops to remove the hops from the vine.

Another object of my invention is to provide a hop picking machine effective to remove substantially all of the growing hops from the vines, but capable of operating with sufficient delicacy so that the hops are not injured by the mechanical picking and handling.

Another object of my invention is to provide means for removing the hops from the vines without removing a large quantity of leaves and stems; that is, a device for selectively removing the hops while leaving, as far as possible, the leaves and stems undisturbed.

A further object of the invention is to provide a hop picking machine having flexibly mounted hop picker elements effective to rove throughout portions of the hop vine being picked, so that the hops are engaged from various different directions and in various different attitudes to promote their removal in the most expeditious fashion.

A still further object of the invention is to provide a hop picking machine in which the action of the picker elements is so gentle as not to injure or cut or tear the hops themselves.

An additional object of the invention is to provide a hop picking machine in which the speed of operation is increased as far as the removal of hops is concerned, but is decreased as far as the speed of the moving parts is concerned.

Other objects, together with the foregoing, are attained in the embodiment of the invention described in the accompanying description and illustrated in the accompanying drawing in which:

Figure 1 is a side elevation of a hop picking machine constructed in accordance with my invention, one end of the machine particularly being shown as a typical section, portions of the entire structure being broken away to reduce the size of the figure and other portions of the frame work of the machine being removed so that a better disclosure of some of the interior parts is had.

Figure 2 is a cross-section of the machine illustrated in Figure 1, the planes of section being indicated by the lines 2—2 of Figure 1.

Figure 3 is an isometric view of a portion of conveyor showing a picker element support and a plurality of picker elements on it in a position they occupy during some of their travel through the machine, some parts being removed to simplify the showing, and other parts being broken away to reduce the size of the figure.

Figure 4 is for the most part a side elevation of a picker element and a picker element support and its environment to an enlarged scale, certain parts being broken away to reduce the size of the figure and other parts being shown in cross-section.

Figure 5 is an end elevation of a picker element suitable for use in my hop picking machine.

Figure 6 is a side elevation of a picker element as illustrated in Figure 5, portions of the figure being broken away to reduce its size and a part of the showing being in a longitudinal cross-section, the plane of which is indicated by the line 6—6 of Figure 5.

The picking of hops mechanically has usually been accomplished in the past by metal fingers rigidly fixed to a drum or carrier that moved in a constant plane. In order that the hops on the inside of the vine might be picked, it has been necessary to tear off much of the vine structure and many of the large leaves. To overcome the tearing of the vine and the leaves, I have arranged for a novel manner of plucking the hops by utilizing a picker disc mounted at the tip of a flexible stem and therewith constituting a picker element. Since the stem is flexible, it can move in all directions into the interior of the vine without tearing the vine or the leaves. Furthermore, this flexible picker element breaks fewer hops as it removes them. Due to the roving action of the picker element in the vine, the picking of the hops is greatly accelerated so that the speed of advance of the moving parts is correspondingly reduced, thereby further reducing the tendency to tear the vine branches and leaves apart. Because of the reduction in breakage, the size and complication of the machine construction are reduced and this is also reflected in a reduction of the number of subsequent operations necessary to clean and separate the picked hops.

Because the type of hops grown and the locality in which the hops are grown has a great bearing on the particular treatment necessary for picking, I have illustrated somewhat diagrammatically herein, a suitable picking machine for general use. This preferably is made up of a number of sections including intermediate sections and end sections. As an example, a typical intermediate section is shown in Figure 1 and a return end is also shown. As many intermediate sections as are necessary are provided at a particular locality for use with a particular kind of hops, and the intermediate sections, whatever their number, are provided with a pair of symmetrical end sections substantially as shown in Figure 1.

In any case there is provided a frame work, generally designated 6, made up of standard structural shapes such as channels and angles and inclusive of upright and the tie members to provide what in effect is a generally rectangular cage. The upper part of the frame work 6 includes an upper pair of side rails 7 and 8 extending longitudinally and a lower pair of side rails 9 and 10 extending parallel to the first pair. Adapted to operate on the upper and lower pairs of rails are conveyor chains including a chain having an upper run 13 and a lower run 14 and a similar chain having an upper run 16 and a lower run 17. The chains in the end sections of the structure are appropriately trained about sprockets 18, mounted on a cross shaft 19 journaled in an upright part of the framework 6. The chains are similarly mounted in the opposite end of the device and are appropriately driven by means (not shown) so that the upper runs 13 and 16 advance toward the right in Figure 1, as indicated by the arrow 21 designating the direction of rotation of the sprocket wheel 18.

At appropriate intervals, each of the chains, especially as shown in Figure 4, is provided with an inturned flange 22 aligned with a similar flange on the opposite chain. Spanning such inturned flanges are angle irons 24 extending transversely of the machine, parallel to each other and spaced apart selected distances. The transverse angles 24 correspond to the grasper bars customarily provided in comparable machines and are provided with releasable retainers 26 manually operable to engage and to grasp the stem or stalk 27 of a hop vine 28 which has been cut and is introduced into the machine butt end first. As the upper runs 13 and 16 advance, the entire hop vine is moved in the general path of advance of the upper run of the conveyors and is drawn through the framework of the machine.

The moving hop vine is brought into one of the intermediate sections, for example the first of such sections, and is given a somewhat undulatory or wavy path of travel as indicated by the broken line 31 in Figure 1. In addition, it is brought into engagement with certain hop picker elements. Some of the elements are advanced in a direction contrary or opposite to the direction of advance of the hop vine as indicated by the arrows 30 in Figure 1. For that reason, I mount on the framework a plurality of cross shafts 32, 33 and 34 effective to support at each side a pair of closed circuit chains 36 and 37. In addition, idler sprockets 38 are provided to maintain the appropriate contour and tension in the chains.

As particularly illustrated in Figure 3, each of the chains, for example the chain 36, is provided at appropriate intervals with inturned flanges 37 to which a transverse angle iron 35 is fastened for example by welding. The angle iron is turned so that its faces are inclined to the general plane of the chain 36. At appropriate transverse spacings on the angle iron 38 is a series of fastening studs 39 adapted to receive washers 40 and securing nuts 41.

In accordance with my invention, each angle iron 35 forms part of a picker element support and on such support a number of identical picker elements are located. These picker elements are unusual in hop picking machinery and are especially distinguished in that each of them is flexible. For example, I provide a body 42 generally rectangular in cross-section throughout most of its length and preferably comprised of rubber, either natural or synthetic, or a comparable rubber compound. One end of the elongated body is enlarged, still retaining a rectangular cross-section, to provide an appropriate base 43 for seating on the support 35 and likewise pierced to accommodate one of the fastening studs 39. Since the bases of the adjacent picker elements are non-circular, the elements are retained by the single studs substantially in appropriately aligned positions. The length and composition of the body 42 is such that it is quite flexible although having a moderate resistance to bending and a substantial resilience as well.

Adjacent its outer or unsupported extremity, each of the elements 42 is changed to a substantially circular cross-section, particularly as shown in Figure 6, and is further reduced in diameter to provide a shouldered mounting boss 44. Encompassing the circular boss and in contact with the shoulder, is a relatively thin picker disc 46. The thin metal disc 46 is preferably formed with a generally planar cross-section but with a central inturned flange 47 which merges with the planar portion in a curved part that seats against the shoulder 45. The periphery of tthe disc 46 is not a continuous circle, but rather is interrupted at suitable intervals with V-shaped or U-shaped notches 48 of such a size and configuration that they readily engage with and receive the stem of a hop but are too small and are of an improper shape to receive the stem of a hop cluster or a leaf stem or any larger part of the hop vine. The notches 48, therefore, are effective to engage a hop stem and to remove the hop from the vine.

Yieldably or resiliently holding the stripping disc 46 in position is a conical rubber washer 49 over-lying the portion 44 of the picker element and preferably held in place by a securing pin 51. This passes through appropriate apertures in the extension 44 and is bent to overlie the cone 49. Since the entire mounting, not only the shoulder of the picker element but also the washer 49, is of ductile material, the disc 46 is effective to orient itself in different directions and to yield slightly without damage to itself if it encounters serious obstructions. It is nevertheless effective to remove the hops selectively without removing substantial amounts of leaves or other unwanted material.

Since the various picker elements 42 are mounted in rows or ranks on the supporting elements 35, they extend entirely across the effective part of the machine and are repeated at intervals on the moving conveyor chains 36 and 37. Thus as the vine passes through the machine, it is assisted in following its undulatory path 31 by the general path of advance of the picker elements, which as they travel, comb or rove through the underneath or depending parts of the vines and assist in removing the hops therefrom. The returning members on the lower run of the conveyor chain 36 and 37, are effective to encounter the hop vine after it has passed around the sprocket 18 and is returning toward the front of the machine in an undulatory path designated by the arrow 52. The lower run of the picker therefore serves to assist in a further or secondary stripping of the hops from the now top part of the returning vine and from the central portions thereof as well.

In addition the upper chains 36 and 37, I provide above the upper part of the hop vine in its first traverse of the framework, additional picker elements. These are of the same type illustrated in connection with the conveyor chains 36 and 37 but are preferably somewhat longer in the shank or body 42. Otherwise, they are identical. A series of picker elements 53 is mounted upon an angle iron 54 extending across the framework and supported thereon by aligned pivots 56. The series of picker elements is consequently rockable about the axis of the pivots. An arm 57 depends from the angle iron and is normally held against a stop 58 by a return spring 59.

When the upper runs of the conveyor chains 13 and 16 advance through the machine, each of the grasper bars 22 strikes against the depending arm 57 and rocks the series of picker elements 53 out of the way of the grasper bars and the initial part of the hop vine. As soon as each bar has passed, however, the spring 59 restores the picker elements 53 to their original condition and they are then effective to comb and rove through the top portions of the advancing vines. Other supplementary picker elements form a duplicate installation generally designated 61, having exactly the same mode of operation. Somewhat similarly, auxiliary picker elements 62 and 63 are mounted below the conveyor chains 36 and 37 to be effective upon the upper portion of the returning hop vine passing along the path 52.

In addition, I provide further means for roving through and combing the bottom part of the returning hop vines and this means includes a duplicate pair of conveyor chains 64 and 65 operating in the direction of the arrows 66 in Figure 1 opposite or contrary to the returning direction of the vine passing in the path 52. In this way, a very thorough combing of each hop vine is had so that substantially all of the hops are gently removed therefrom selectively without the detachment of many leaves or stems.

All of the detached material which has been removed by the picker elements falls by gravity downwardly through the mechanism onto an advancing belt 71 appropriately trained around sprockets such as 72 and 73 suitably journaled in the framework 6. This belt is preferably of a diamond mesh type customarily utilized and conveys the larger debris such as leaves out of the machine, although it permits hops and some smaller particles to fall further by gravity. The smaller material passing beneath the screen 71 travels over a pair of separators 74 and 76 of the customary fishnet type operated in connection with an air-blast from nozzles 77 and 78. This structure is effective to cause any falling leaves or large particles to adhere to the fishnet and then to discharge over the upper end of the belts into either one or the other of a pair of conveyors 79 and 80 leading to an appropriate discharge point. The hops themselves roll down by gravity over the separator belt 74 and 76, not being restrained by the blast, and finally fall into hop conveyors 81 and 82 respectively, leading to appropriate points of discharge for further processing and handling.

In accordance with my invention, therefore, I have provided a representative hop picking machine equipped with hop pickers of a flexible type having metallic discs notched around their peripheries to engage and selectively detach the hops from the rest of the vine material, roving through the vines as they travel in undulatory paths through the machine and thoroughly traversing the interior of the vines as well as the superficial parts. Being elastic, the pickers when displaced or diverted by the vines spring back with some force to plunge again into the vines for further hop detachment. In this way the picking of the hops is done gently, yet done with great speed so that the chain mechanisms can move slower than usually is the case. Very little unwanted material is detached although a thorough picking of the vines is assured.

What is claimed is:

1. A hop picking machine comprising a mounting, a flexible picker element on said mounting, said element including a rubber member having a rectangular base at one end and a cylindrical shoulder portion at the other end and including a notched metal disc secured against said shoulder.

2. A hop picking machine picker element comprising an elongated rubber member adapted to be fastened at one end and to be free at the other end, a metal circular disc mounted against a shoulder on said member at the free end thereof and extending outwardly beyond said shoulder, and a fastener for holding said disc against said shoulder, said disc having notches around the circumference thereof.

3. In a hop picking machine, a frame, a first conveyor on said frame and movable in a predetermined path, means for affixing a hop vine to said first conveyor for movement in said path, a transverse bar rotatably mounted on said frame, a plurality of rows of upper picker elements mounted on said bar, a lever affixed to said bar and depending therefrom for movement into and out of said path, a detaining stop on said frame, means for urging said lever against said detaining stop and into said path, and means on said first conveyor and movable therewith in said path for colliding with said lever to swing said lever out of said path and so rotate said bar and move said flexible members transversely of said first conveyor out of said path of said hop vine, a second conveyor on said frame and movable in a selected path, a plurality of rows of lower picker elements affixed to said second conveyor and extending from the upper run thereof toward said upper picker elements and into the path of said hop vine, all of said upper and lower picker elements being comprised of elongated longitudinally and transversely flexible members having discs extending transversely of said members at the free ends thereof, said discs having longitudinally and transversely opening notches therein.

GEORGE E. MILLER.

References Cited in the file of this patent

UNITED STATES PATENTS

| Number | Name | Date |
|---|---|---|
| 1,008,914 | Horst | Nov. 14, 1911 |
| 1,054,119 | Horst | Feb. 25, 1913 |
| 1,241,028 | Sanford | Sept. 25, 1917 |
| 1,348,139 | Horst | July 27, 1920 |
| 1,834,479 | Taylor | Dec. 1, 1931 |
| 1,935,803 | Lilliston | Nov. 21, 1933 |
| 2,064,748 | Hinds | Dec. 15, 1936 |
| 2,139,029 | Miller | Dec. 6, 1938 |
| 2,187,526 | Thys | Jan. 16, 1940 |
| 2,211,357 | Thys | Aug. 13, 1940 |
| 2,222,767 | Gray | Nov. 26, 1940 |
| 2,226,206 | McConnel et al. | Dec. 24, 1940 |
| 2,275,959 | Hormacheck | Mar. 10, 1942 |
| 2,300,157 | Hunt | Oct. 27, 1942 |
| 2,391,138 | Dauenhauer | Dec. 18, 1945 |